(12) United States Patent
Dube'

(10) Patent No.: US 6,320,705 B1
(45) Date of Patent: Nov. 20, 2001

(54) ADJUSTABLE OPTICAL WEDGE

(76) Inventor: George Dube', 342 W. Manor Dr., Chesterfield, MO (US) 63017

( * ) Notice: Subject to any disclaimer, the term of this patent is extended or adjusted under 35 U.S.C. 154(b) by 0 days.

(21) Appl. No.: 09/227,436

(22) Filed: Jan. 8, 1999

Related U.S. Application Data

(60) Provisional application No. 60/071,552, filed on Jan. 15, 1998.

(51) Int. Cl.$^7$ .................... G02B 9/00; G02B 1/06; G02B 13/08
(52) U.S. Cl. .................... 359/796; 359/665; 359/666; 359/667; 359/668
(58) Field of Search .................... 359/796, 665, 359/666, 667, 668

(56) References Cited

U.S. PATENT DOCUMENTS

| | | | | |
|---|---|---|---|---|
| 3,941,451 | * | 3/1976 | Humphrey | 350/16 |
| 4,934,798 | * | 6/1990 | Bunch | 359/19 |
| 5,387,999 | * | 2/1995 | Hayashi | 359/557 |
| 5,440,357 | * | 8/1995 | Quaglia | 351/158 |
| 5,627,674 | * | 5/1997 | Robb | 359/355 |

* cited by examiner

*Primary Examiner*—Georgia Epps
*Assistant Examiner*—Michael A. Lucas
(74) *Attorney, Agent, or Firm*—Henry W. Cummings

(57) ABSTRACT

The present invention relates to a method, apparatus and lubricant composition for an adjustable wedge that utilizes the relative positioning of adjacently disposed convex and concave surfaces with equal spherical or cylindrical curvatures contacted together by a thin layer of lubricant.

41 Claims, 7 Drawing Sheets

ADJUSTABLE OPTICAL WEDGE

REFERENCE TO RELATED APPLICATION

Reference is made to Provisional Application Ser. No. 60/071,552, filed Jan. 15, 1998, of which this application is a continuation thereof.

FIELD OF THE INVENTION

This invention relates to an improved adjustable wedge for controllably changing the relative orientation of certain surfaces of the wedge. In a particular embodiment, one or more surfaces of the adjustable wedge are used to control the direction of a light beam reflected from and/or refracted through said surface or surfaces, respectively.

BACKGROUND OF THE INVENTION

The use of two lenses, one plano-convex and one plano-concave, with matching curved surfaces in close proximity to create an adjustable optical wedge or adjustable prism (FIG. 1) to deviate or align a transmitted optical beam has been known since at least 1929 (Cox, U.S. Pat. No. 1,735,108). The beam is deviated by translating or rocking one lens with respect to the other to change the angle between the flat external surfaces (the wedge angle), while keeping the space between the curved surfaces unchanged (FIG. 2). This "ball and socket" type movement is a rotation of one lens about the common center of the two spherical or cylindrical surfaces.

For a small angle ($\phi < 10°$) wedge used at or near normal incidence in air, the angular deviation ($\delta$) of a transmitted light beam is given approximately by, $$\delta \equiv (n-1)\phi \qquad \text{EQ. 1}$$

where ($\phi$) is the angle between the two flat exterior faces of the adjustable optical wedge and (n) is the refractive index of the lenses.

The relationship between the translation (T) of the lens in a direction perpendicular to the light beam axis and the angle between the two nominally parallel exterior faces of the device ($\phi$) is given by, $$\tan \phi = T/R \qquad \text{EQ. 2}$$

where (R) is the radius of curvature of the curved surfaces.

Throughout this document the term "light" refers not only to visible electromagnetic radiation, but also to ultraviolet or infrared electromagnetic radiation.

Each surface encountered by the light beam reflects a certain fraction of the incident light. The magnitude of this fraction increases as the difference between the two refractive indices increases. This reflection may be eliminated or greatly reduced by the application of an anti-reflection (AR) coating to those surfaces or by making the refractive indices on both sides of the surface equal, as is well known to those skilled in the art.

In many applications, the desired range of deviation of a transmitted light beam is a few degrees on either side of zero deviation (for example −3° to +3°). In these applications it is often desired that the device that deviates the beam direction does not translate the axis of the beam away from its original axis or transverse position. This ability to deviate the direction of a light beam without translating the axis of that beam is a particular advantage of the adjustable optical wedge.

In other applications a similar (~6°) range of deviation is desired, but centered about a finite deviation. Nominal deviations greater than zero may be created by adding one or more fixed or adjustable wedges or prisms to the device. Thus, with the lenses in their centered positions, the beam is still deviated. (For example, FIG. 5 shows the optical components of another embodiment of the present invention, an adjustable optical wedge with a range of deviation from ~27° to ~33°.

If the incident light is polychromatic, the deviation of the device will vary with the wavelength of the transmitted light. This chromatic difference of deviation or dispersion is useful in many application, such as spectrometers. In other applications, such as movie or slide projectors, it is desired to make the deviation the same for at least two different wavelengths. This achromatization may be realized by using two or more different optical materials with differing material dispersions, as is well known in the prior art (FIG. 6).

Larger ranges of deviation may be obtained by using components with sharper curvature (smaller radius of curvature), by using two or more adjustable optical wedges in series, or by combining two adjustable wedges into one. (One example of such a combination is shown in FIG. 7.)

As is well known to those skilled in the art, wedges illuminated through their edge or edges are used to distribute light in numerous applications, such as instrument dials and panels.

Also well known to those skilled in the art is the use of wedges to minimize the aberrations that a tilted parallel plate or window introduces into a converging transmitted light beam.

In some applications the adjustment of the deviation of the beam or beam alignment is made infrequently and the two lenses are kept motionless for extended periods of time. In those cases, the two curved surfaces may be separated while the adjustment is made and then pressed into contact with each other for the extended period during which they are stationary.

In other applications it is desired to adjust the deviation of the beam more frequently. In these cases the curved surfaces can not be left in contact with each other during the movement because they will scratch or abrade each other as they move with respect to each other. This abrasion causes increased scattering of light, increased friction between the two curved surfaces and the creation of objectionable particles. This abrasion problem has previously been mitigated in several different ways, which are reviewed below. None of these prior art devices have been entirely satisfactory.

Merkel, U.S. Pat. No. 3,253,525, taught solving the abrasion problem by placing the two curved surfaces contiguous but spaced. With this approach, a support structure must be provided to keep the lenses separated while one lens is moved with respect to the other. As the movable lens must be rotated about the center of curvature of its curved surface, the structure is often quite large and often blocks the transmitted light beam, as the beam usually passes through that same center. With this approach, both of the curved surfaces and both of the flat surfaces must be antireflection coated if the device is to efficiently transmit a light beam. Also with this approach, the finite gap between the lenses introduces aberrations, distortions, and vignetting of the beam as will be described more fully herein.

These distortions, aberrations and vignettings may be eliminated by reducing the gap to zero thickness or by filling the gap with an index matching material. However, all prior art devices that reduce the gap thickness or fill the gap with index matching material have limitations, as will be described below.

Donelan, U.S. Pat. No. 4,436,260, taught leaving a very narrow gap (less than one wavelength of light) between the two curved surfaces and using an air bearing to keep the surfaces from scratching or abrading each other. A support structure is again required to keep the lenses close to each other and all four lens surfaces must be antireflection coated for high transmission. The air bearing is an expensive and complicated device which subjects the curved surfaces to contaminates that in time degrade the performance of the device. In addition the air bearing requires blocking or distorting part of the clear aperture of the device as a channel must be provided to bring the air into the center of the gap.

Swain, U.S. Pat. No. 4,961,627, taught placing ball bearings between the curved surfaces near the outer rim to keep the separation between the curved surfaces constant and optionally filling the gap with free-flowing refractive index matching liquid. A complicated structure is required to hold and move the lenses in the appropriate manner. A bellows or reservoir structure is required to contain the index matching liquid, which would otherwise flow out of the gap between the two curved surfaces. The index matching liquid eliminates the reflection loss and the need for anti-reflective coatings at the two curved surfaces. The relatively thick layer of index matching liquid may introduce distortions into the transmitted beam due to thermal gradients in the liquid. The motion and reservoir structures are also often large, heavy, and prone to leak.

Harris, U.S. Pat. No. 3,614,194; Cohen, U.S. Pat. No. 4,588,263 and Linder, U.S. Pat. No. 3,884,548 describe adjustable optical wedges with no lubricant and make no mention of a solution to the abrasion problem.

None of these prior art techniques have been entirely successful and adjustable optical wedges have not found widespread use. The present invention is an improved solution to the abrasion problem, which also improves the performance, compactness and cost effectiveness of the adjustable wedge. This improved performance opens up some new scanning and reflective applications for adjustable optical wedges, as will be described more completely herein.

SUMMARY OF THE INVENTION

One object of the present invention is to provide an adjustable wedge assembly and method that uses a thin layer of lubricant to reduce the friction and abrasion associated with the translation of two matched spherical or cylindrical surfaces across each other.

Another object of the present invention is to provide an adjustable optical wedge assembly and method that deviates a light beam by translating at least one spherical or cylindrical surface against a matching curved surface with greatly reduced abrasion of those surfaces.

Another object of the present invention is to provide an adjustable optical wedge assembly and method that eliminates or minimizes distortions, aberrations and/or vignetting of transmitted light beams by eliminating the air gap between the internal curved surfaces.

Another object of the present invention is to provide an adjustable optical wedge assembly and method that eliminates or minimizes distortions, aberrations and/or vignetting of transmitted light beams by minimizing deviation of the light beam at the curved surfaces.

Another object of the present invention is to provide an adjustable optical wedge assembly and method with a compact and simple adjustment mechanism.

Another object of the present invention is to provide an adjustable optical wedge with high (>98%) transmission even without antireflection coatings on the curved surfaces.

Another object of the present invention is to provide an adjustable optical wedge assembly and method that has minimal internal reflections of a transmitted light beam even without antireflection coatings on the curved surfaces.

Another object of the present invention is to provide an adjustable optical wedge that can translate a transmitted light beam in addition to independently deviating that same light beam.

Another object of the present invention is to provide a lubricating composition and method of lubricating the internal wedge surfaces.

Another object of the present invention is to provide a compact and precise device for altering the angle of a reflective surface by small amounts (less than ten degrees).

These and other objects will become apparent to those skilled in the art in light of the following disclosure and accompanying drawings.

This invention teaches the construction and method of operation of an adjustable wedge that places a convex surface and a concave surface with nominally equal curvatures in contact, separated only by a thin layer of lubricant (FIG. 1). In those cases where the adjustable wedge is used with transmitted light, the lubricant must be nominally transparent for the light being used, and the device is called an adjustable optical wedge. The two or more components with curved surfaces are then called lenses.

The lubricant lubricates the curved surfaces while they are in motion with respect to each other to change the angle of the wedge. The lubricant also holds the two surfaces in contact with each other, through surface tension, so that the complicated support and guidance structures of the prior art are not necessary. The adjusting movement is a sidewise translation of one lens with respect to the other. Before, during and after this motion, the lubricant holds the two curved surfaces together without any need for external supports. This lubrication solves the abrasion problem and allows a lens or curved surface to be repeatedly translated across the matching surface of another lens or curved surface without any noticeable abrasion or degradation in the device or in the quality of a transmitted light beam.

I have experimentally found that certain transparent liquids will wet and stick to the curved surface of certain lenses or optical components in lubricated contact with each other during and after numerous translations of those surfaces. If a few drops of the liquid/lubricant are placed upon one lens and the matching lens is then pressed against the moistened lens, the lubricant will spread so as to completely coat and connect the curved surfaces. If the refractive index of the lubricant is nominally equal to the refractive index of the lenses, the reflection of light at the curved surfaces will be eliminated or greatly reduced and light will be efficiently transmitted through those surfaces. This eliminates the cost and complication of antireflection coatings.

This ability of the lubricant to wet the surface of the lens and completely fill the very small gap between the two lenses is unaffected by exposure of portions of the wetted surface to air for extended periods of time (months). Thus, under many practical circumstances, no bellows or reservoir is required to contain additional amounts of the lubricant. However, this invention also covers adjustable wedges in which at least two components or lenses are placed together, separated by only a thin layer of nominally transparent lubricant, whether or not a reservoir, or other means, is included to contain a supply of that lubricant. The essence of this present invention is that the movement of at least one convex or concave surface is guided by its lubricated contact with another surface with equal concave or convex curvature, respectively, instead of by any external support structures, such as the pivoted lens mounts or ball bearings of prior art devices.

The lubricating composition should have sufficient viscosity and wetting ability to wet the two opposing internal wedge surfaces and a refractive index which is generally compatible with the refractive index of the wedge materials. Additional key features are that the lubricant must wet the surfaces of the lenses for extended periods of time and for numerous translations. It must hold the two closely matched curved surfaces together via surface tension. The lubricant must not entrap air bubbles between the two lenses and must not evaporate during extended exposure to air (when the lenses are not in the null position). It must be transparent to the light being used and must not harden or discolor. It's refractive index should match that of the lenses, but anti-reflection coatings can be added between the lens and the lubricant if the refractive index of the lubricant does not match the refractive index of the lenses. For higher speed applications, the lubricant should allow for easy movement of one lens with respect to the other lens and should not heat up excessively during rapid movements for extended periods of time. The viscosity of the lubricant can vary widely from less than 150 cps to more than 1250 cps.

As an example, it has been found that compositions containing terphenyls, halogenated terphenyls, polybutane and mineral oil perform satisfactorily. The lubricant was "Resolve" Microscope Immersion Oil - Low Viscosity, manufactured by Criterion Sciences, Division of Cornwell Corporation, Riverdale, N.J. 07457-1710. This highly transparent (water white) features a refractive index ($n_{liq}$) of 1.516, which closely matches the refractive index of the BK-7 glass used for both lenses ($n_{20}=n_{30}=n$). It is a mixture of hydrogenated terphenyls, terphenyls, mineral oil and polybutane. It is available with a viscosity of 150 cps or 1250 cps. Both versions work well. It does not contain any PCBs, is stable and low in toxicity.

Common 5W-30 motor oil also worked, but its transmission was not as high as the transmission of the microscope immersion oils. We expect that a large number of liquids, including silicones, hydrocarbons and fluorosilicones will be suitable lubricants.

A transmitted beam may also be translated by tilting the entire adjustable optical wedge (FIG. 2D). In this function the device works simply as a thick window or transparent block. The translation of the beam (t) is given by, $$t = L \sin(\theta - \theta')/\cos \theta' \qquad \text{EQ. 3}$$

where L is the thickness of the combined transparent elements, $\theta$ is the angle of incidence of the incident ray and $\theta$ is the refracted angle $\{n \sin \theta' = n_a \sin \theta\}$, where (n) is the refractive index of the wedge and ($n_a$) is the refractive index of the surrounding environment. Usually that surrounding environment is air and ($n_a=1.0$). The ability to both deviate and translate a light beam with a single device is one of the advantages offered by this method and device.

In some applications, such as laser mirrors or interferometer mirrors, the desired range of deviation of reflected beams is very small (often less than one degree). Conventional mirror mounts are limited in their ability to make very small changes in angles because the angular change is determined by the actuator driven translation distance of the mirror (T'), divided by the lever arm or distance from the pivot point to the actuator. In many practical devices that distance from the pivot point to the actuator is limited to no more than a few centimeters and the ability to precisely make very small adjustments in the angle of the mirror is made difficult by the relatively short lever arm and by the stiction of any mechanical movement If, however, an external surface of an adjustable wedge is made reflective, the change in the angle between the two external surfaces is then given by the actuator driven translation of that lens (T), divided by the radius of the curved surfaces (R). As this radius (R) may be as large as several hundreds of centimeters, the effective lever arm of this "mirror mount" can be very large, even in a compact device. Thus, the present invention may find new applications as mirror mounts for making very small precise changes in the angle of the reflecting surface. It may also find new applications for making small precise adjustments in the angle of one or more surfaces for non-optical applications.

Many mechanical designs may be employed to translate a curved surface over a matching surface. Because the movement is a translation perpendicular to the beam axis and not a rotation about a distant center of curvature, no structural guide, other than the second curved surface, is necessary to hold the components in contact, and the device may be quite small and simple.

Many sources of power may be used to translate one or more of the components. These means include manual mechanical means, electrical means, pneumatic or hydraulic means. Mechanical means includes conventional bolts, micrometer screws, cams, levers, or wedges. Electrical means includes electric motors, electric stepper motors, or piezoelectric actuators. As the present invention greatly reduces the abrasion problem, adjustable wedges of this present invention may find new applications in low to medium speed optical scanners where the movement of the components may be continuous for extended periods of time.

DETAILED DESCRIPTION OF THE PREFERRED EMBODIMENTS

Figure 1:
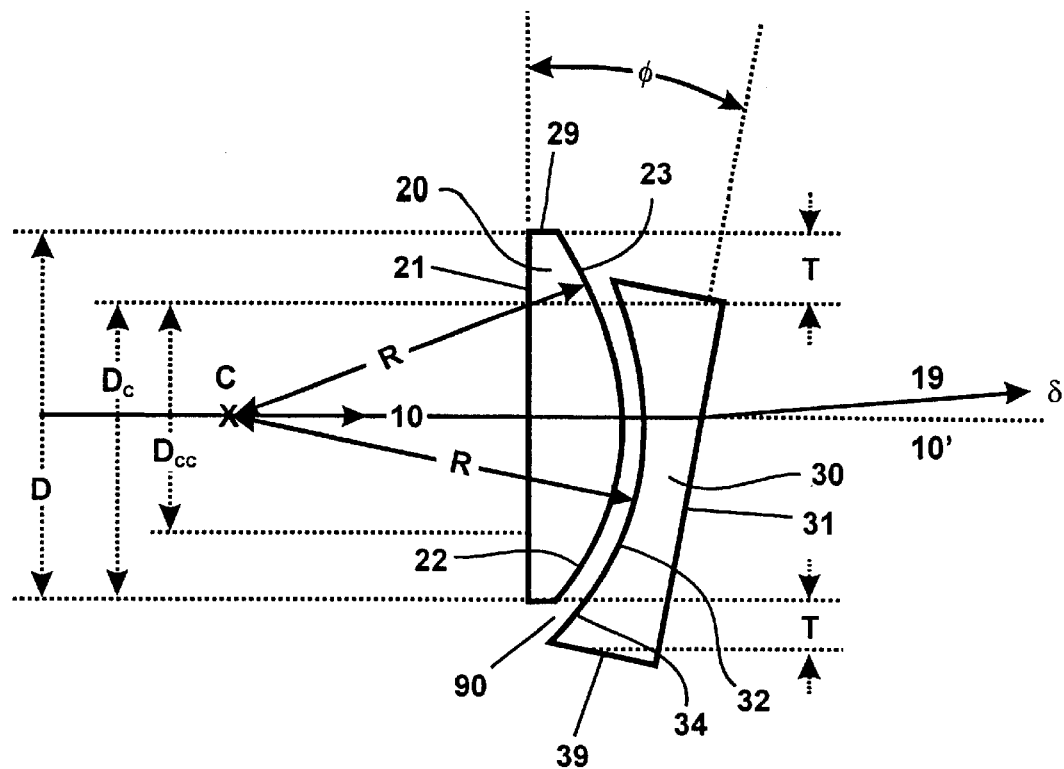
FIG. 1 is a cross-sectional view of the optical components of one illustrative embodiment of an adjustable optical wedge of the present invention, showing its use to deviate a transmitted ray upward by an angle ($\delta$) and identifying the parameters used is describing this invention.

An illustrative embodiment of the optical components of an adjustable optical wedge of the present invention is shown in FIG. 1, which also shows a transmitted light ray. For clarity of explanation, none of the reflected rays are shown in FIG. 1. The behavior of reflected rays will be described later in this document.

This embodiment uses two lenses or components with spherical surfaces and translation of one lens in two orthogonal directions to deviate the beam in two orthogonal directions, each such direction being perpendicular to the original beam axis. In this manner a transmitted beam may be deviated to any direction within the limits of the device. This embodiment features simplicity and relatively low cost. Other designs may be more appropriate for certain applications. This example is merely illustrative.

In FIG. 1, component (20) is a plano-convex lens with flat surface (21), curved surface (22), edge (29), and refractive index ($n_{20}$). The radius of the spherical surface (22) is (R) and the center of curvature of spherical surface (22) is labeled (C). The second component (30) is a plano-concave lens with flat surface (31), curved surface (32), edge (39) and refractive index ($n_{30}$). Spherical surface (32) has the same radius (R) as surface (22) and surface (32) also has its center of curvature as close as practicable to and coaxial with the center (C) of spherical surface (22). In this example the lenses are of the same transverse extent or diameter (D) and are made of the same material (for example BK-7 optical glass) so they have the same refractive index ($n=n_{20}=n_{30}=1.517$). The centerline thickness of the combined lenses is (L in FIG. 2D). In the descriptions that follow, lens (20) will be considered a stationary lens and lens (30) will be considered a movable lens. As is well known to those skilled in the art, other movements may be used to accomplish the same purposes, this example is merely illustrative.

In accordance with the present invention, between the two curved surfaces (22 and 32) is a uniform thin layer of nominally transparent lubricant (90—shown in gray), preferably a with a refractive index ($n_{liq}$) nominally equal to the refractive index of the lenses (n). The thickness of the lubricant layer is enlarged in the drawings for clarity. In practice the lubricant layer is typically less than 0.1 mm. Preferably, this also has sufficient wetting ability to wet the two opposing wedge surfaces for extended periods, has good long term stability, good lubricating properties and a high resistance to evaporation, moisture pickup, solarization and photodegradation It is this layer of lubricating fluid that is the essence of this invention. Prior art devices used either as air gap or a thick layer between the two noncontacted curved surfaces.

The angle between the two flat external surfaces of the device is ($\phi$). This angle, also known as the wedge angle, is adjusted by sliding the plano-concave lens (30) a distance (T) across the lubricated matching surface (22) of the plano-convex lens (20). Movement in only one plane is shown in FIG. 1, but those skilled in the art will understand that a similar movement may be used in an orthogonal direction.

The relationship between the translation of the lens (T) in a direction perpendicular to the light beam axis and the wedge angle between the two nominally parallel exterior faces of the device ($\phi$) is given by, $$\tan \phi = T/R \qquad \text{EQ. 2}$$

where (R) is the radius of curvature of the curved surfaces.

An incident axial light beam (10) enters the device from the left and exits from the right. The axis of the device is determined by a line connecting (C) the center of curvature of surface (22) of lens (20) and the center of surface (22) of that lens. After leaving the device the light beam is designated as (19) and the original light beam direction or axis extended is shown as (10'). The angle between the final light beam (19) direction and the original light beam direction or axis extended (10') is the deviation angle ($\delta$) imparted to the light beam by the device.

Figure 5:
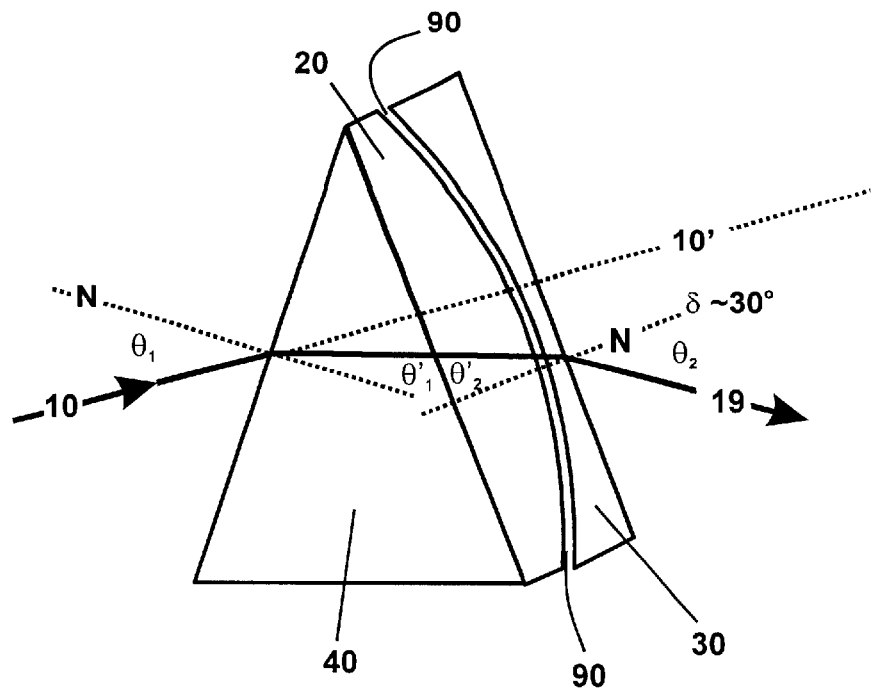
FIG. 5 is a cross-sectional view of the optical components of one illustrative embodiment of an adjustable optical wedge of the present invention used to adjust the deviation about a nominal deviation of approximately 30°.

The angular deviation ($\delta$) of a transmitted light beam is given by, $$\delta = \theta_1 + \theta_2 - \theta'_1 - \theta'_2 \qquad \text{EQ. 4}$$

Where ($\theta'_1$) and ($\theta'_2$) are the angle of incidence of the light beam inside the prism at the first and second flat surfaces, respectively, and ($\theta_1$) and ($\theta_2$) are the angles of incidence of the light beam outside of the prism at the first and second surfaces, respectively (see FIG. 5). The angle of incidence is the angle between the incident ray and the normal (N) to the surface at the point where the ray encounters that surface. From Snell's Law, $$n \sin \theta' = n_a \sin \theta \qquad \text{EQ. 5}$$

where n is the refractive index of the prism or wedge and $n_a$ is the refractive index of the surrounding environment. Usually the surrounding environment is air and ($n_a=1.0$).

For small angles (less than 10°) and a wedge used in air, these relationships can be closely approximated by $$\phi = T/R \qquad \text{EQ. 6}$$

$$n\,\theta' = \theta \qquad \text{EQ. 7}$$

If, in addition, the wedge is used at or near normal incidence ($\theta_1 \equiv \theta'_1 \equiv 0$), then $$\delta = (n-1)\phi = (n-1)T/R \qquad \text{EQ. 8}$$

In FIG. 1, the moveable lens (30) has been lowered from the matched, centered or null position relative to the stationary lens (20). This causes flat surfaces (21 and 31) to form a wedge with its apex below the axis. The ray transmitted through this wedge is deviated upward, as is shown in FIG. 1 and well known to those skilled in the art.

As can be seen in FIG. 1, when the lenses are not in their centered position, the clear aperture ($D_c$) of the device is reduced by approximately (T) from the top. As we are considering the left or plano-convex lens as the stationary lens, there is no reduction in the clear aperture from the bottom. The center of the clear aperture is also shifted by approximately T/2 in the downward direction of the translation (T). Thus the diameter of the clear aperture that remains centered on the original axis of the device ($D_{cc}$) is approximately given by, $$(D_{cc})=D-2T_{max} \qquad \text{EQ. 9}$$

where ($T_{max}$) is the maximum value of the translation distance (T). ($T_{max}$) may be different in two orthogonal directions, but in the example considered, the lenses are circular and ($T_{max}$) is the same in both orthogonal or Cartesian axes.

If the diameter ($D_{30}$) of the movable lens (30) is larger than the diameter ($D_{20}$) of the stationary lens (20 in FIG. 1), the clear aperture can remain fixed in diameter and centered as the angle of the adjustable optical wedge is changed. For these reasons, it may in some embodiments be preferable for the diameter of the movable lens (30) to be larger than the diameter of the stationary lens (20). The clear aperture will be unaffected by lens movement if $$D_{30} > D_{20} + 2\, T_{max} \qquad \text{EQ. 10}$$

For simplicity we have described a device in which one lens remains stationary while another lens in lubricated contact with the first lens is translated in two orthogonal directions to control the orientation and angle of the adjustable wedge. In another embodiment, one lens can be translated in one direction only and the second lens may be translated only in the orthogonal direction. In another embodiment, both lenses might be moved in a manner that keeps each of their centers equidistant from the axis of their mutually centered position. In another embodiment, one lens may be translated in only one direction orthogonal to the beam axis and the entire device may be rotated about the nominal beam axis to change the direction in a polar coordinate fashion In this embodiment the matched curved surfaces (22 and 32) may be either cylindrical or spherical. These and other movement embodiments are within the scope of the present invention as long as the movement is guided by at least two curved surfaces in lubricated contact.

In FIG. 1, the incident beam (10) is shown at normal incidence ($\theta_1=0$) to the flat surface (21) of the plano-convex lens (20). At surfaces (22) and (32) the beam is unaffected as the refractive indices are equal on both sides of those surfaces. Thus, the light beam (10) that starts at normal incidence follows its original axis until it is refracted at the tilted flat surface (31) and exits the device.

Thus the effective pivot point of the deviated beam is the intersection of the original light beam axis (10), extended if necessary, with the external surface (31) of the device. The distance from the center of curvature of surface (22) or from any fixed point in space to the effective pivot point or point where the ray is deviated changes slightly as the wedge angle ($\phi$) is changed, but the pivot point never leaves the extended axis of the incident light beam. If the light beam encounters the adjustable optical wedge at normal incidence, the beam is never translated away from its original axis. As will be explained herein, at incident angles other than normal incidence the technique of the present invention may be used to translate the light beam a distance (t) in addition to, but independently of, any angular deviation ($\delta$) that the device may impart to the direction of the transmitted light beam.

With the plano-concave lens in the lowered position shown in FIG. 1, the upper portion of wetted curved surface (22) is exposed to the air or the ambient environment. This exposed portion is shown as (23) in FIG. 1. Similarly, the lower portion of the wetted surface (32) is exposed to the air. This exposed portion is shown as (34). It has been found that with carefully selected lubricants, lens materials and handling procedures, these wetted surfaces will remain wetted for at least many months of operation. In another embodiment a flexible seal and reservoir are provided to contain an additional volume of the lubricant. In another embodiment, a hole or passageway is formed from the outside of the adjustable wedge structure to the curved lens surfaces so that additional amounts of the lubricant may be added to keep the curved surfaces wetted. In another embodiment a wick saturated with lubricant may be provided to apply lubricant to the curved surfaces for at least part of their range of motion and/or part of the time. The wick may extend from below the surface of a pool of lubricant to the lens surfaces so that the lens surfaces are continuously wetted by the lubricant laden wick.

Figure 2:
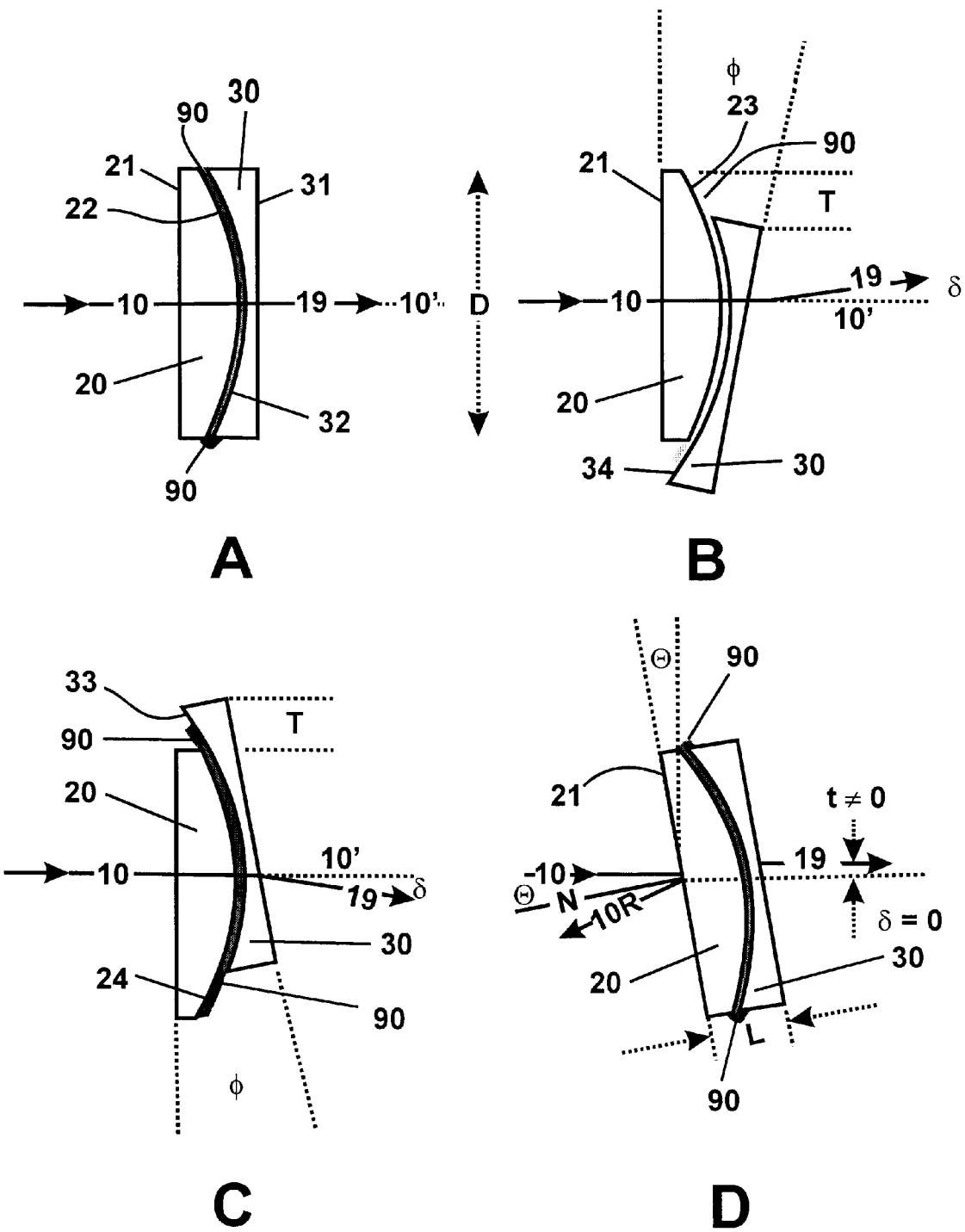
FIGS. 2A through 2D are four cross-sectional views of the optical components of one illustrative embodiment of an adjustable optical wedge of the present invention, showing its adjustment in the null setting (FIG. 2A), in the setting for deviating a transmitted ray upward (FIG. 2B), in the setting for deviating a transmitted ray downward (FIG. 2C), and in the setting for translating upward an undeviated ray (FIG. 2D).

FIG. 2 is a cross-sectional view of the optical components of one illustrative embodiment of an adjustable optical wedge of the present invention showing its adjustment in the null setting (FIG. 2A), for deviating a transmitted ray upward (FIG. 2B), for deviating a transmitted ray downward (FIG. 2C), and for translating upward an undeviated ray (FIG. 2D).

In FIG. 2A, the incident beam (10) is shown at normal incidence ($\theta_1=0$) to the flat surface (21) of the plano-convex lens (20). Because the lenses are in their centered position, the two flat surfaces (21 and 31) of the lenses (20 and 30), respectively, are parallel to each other ($\phi=0$) and there is no deviation of the transmitted beam ($\delta=0$) and no translation of the transmitted beam (t=0). Thus, the exiting light beam (19) and the incident light beam extended (10') are coincident or coaxial.

In FIG. 2B, the relative position of the two lenses has been altered. The second (plano-concave) lens (30) has been lowered or translated by a distance (T) with respect to the centered position with the first lens (20) to produce a wedge angle ($\phi$) between the two flat surfaces which results in an upward deviation ($\delta$) of the transmitted beam (19). With the lenses no longer in the centered position, part of the wetted surface of each lens is exposed to the ambient environment, usually air The exposed upper portion of lens (20) is shown as (23). The exposed lower portion of lens (30) is shown as (34).

In FIG. 2C, the relative position of the two lenses has been altered in the opposite direction. The second lens (30) has been raised a distance (T) with respect to the centered position with the first lens (20) to produce a wedge angle ($\phi$) between the two flat surfaces which results in a downward deviation ($\delta$) of the transmitted beam (19). The exposed lower portion of lens (20) is shown as (24). The exposed upper portion of lens (30) is shown as (33).

In FIG. 2D, the lenses (20 and 30) have returned to the centered position so the two flat surfaces (21 and 31) are parallel ($\phi=0$), but the entire device has been tilted to produce a tilt angle ($\theta$) between the normal (N) to the first flat surface (21) and the incident light beam (10). Because of this tilt, the transmitted beam (19) is translated an amount (t) in the upward direction. The emerging beam (19) is parallel to its original direction ($\delta=0$), but translated from its original axis (t≠0). The distance from where the light beam exits the device to the incident light beam axis extended is the translation (t) imparted to the light beam by the device (FIG. 2D). This translation imparted to the transmitted beam (t) is given by, $$t = L \sin(\theta_1 - \theta'_1)/\cos(\theta'_1) \qquad \text{EQ. 3}$$

where (L) is the combined thickness of the lenses.

In another embodiment, where maximum translation (t) is desired, the lenses should be made thick and/or attached to thick windows or transparent blocks to maximize (L). As the tilting ($\theta$) is independent of lens translation (T), this one technique may translate the beam independently of deviating the beam or deviate the beam independently of translating the beam. An attractive feature of this embodiment is that it may translate the beam independent of deviating the beam or deviate the beam independent of translating the beam. It will be apparent, that increasing the thickness of the lenses (L) will result in a reduction of the clear aperture ($D_c$), especially at the larger tilt angles ($\theta$).

A fraction of the incident beam (10) is reflected at surface (21). This reflected beam is shown as (10R) in FIG. 2D. A similar reflection occurs in FIGS. 2A, 2B and 2C, but because the light beam (10) is perpendicular to surface (21), the reflected beam (10R) returns along the same path that it followed in reaching the device. There is, in general, a reflection at every surface, but the reflections from both curved surfaces (22 and 32) are eliminated or greatly reduced in embodiments for which the lubricant (90) has a refractive index ($n_{liq}$) equal or nearly equal to the refractive index (n) of the lenses, respectively. In another embodiment, the reflection from the flat surfaces (21 and 31) are reduced by the application of antireflection coatings. If the incident light is linearly polarized, the reflections at the flat surfaces may be greatly reduced in another embodiment by placing the device so that the angle of incidence is at or near Brewster's Angle, as is well known to those skilled in the art. Thus in applications with linearly polarized light, the extra cost and complications of antireflection coatings may be avoided completely.

Figure 3:
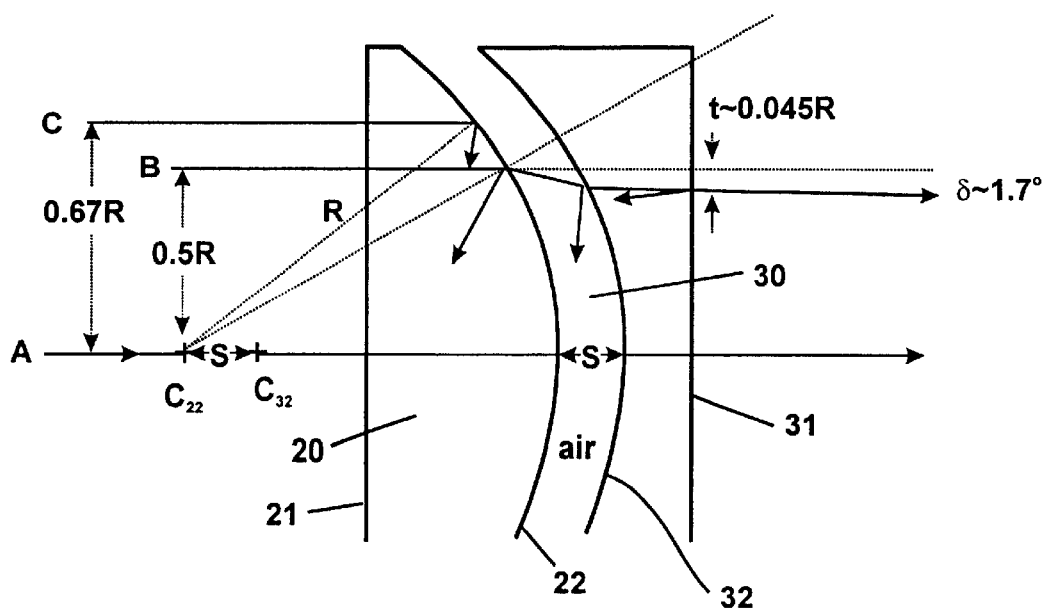
FIG. 3 is a cross-sectional view of the optical components of a prior art device containing an air gap and showing the distortion in translation, aberration of deviation and vignetting that this air gap causes.

FIG. 3 illustrates the distortion, aberration and vignetting introduced into a transmitted beam by prior art devices that had an air gap between the two curved surfaces of equal radius of curvature (R) and refractive index (n=1.52). The center of curved surface 22 is $C_{22}$ and the center of curved surface 32 is $C_{32}$. The curved surfaces and their centers are separated by a distance (S=0.19R). In this figure, three rays (A, B and C) of an incident light beam are shown encountering the first flat surface (21) at normal incidence. Only the top half of the device is shown. The bottom half behaves in a symmetric manner. The device has its lenses in the centered position and the intent of this device is therefore to cause neither translation nor deviation of any part of the beam (t=0 and $\delta$=0).

The lowest ray (A) is in the center of the device. This ray encounters both flat surfaces (21 and 31) and both curved surfaces (22 and 32) at normal ($\theta$=0) incidence. This ray is therefore undeviated ($\delta$=0) and untranslated (t=0) by the device, as desired It has fairly high transmission, even if no antireflection coatings are used and its transmission does not depend upon the polarization of the light.

The next ray shown (B), enters the device at a height of 0.5R from the center and encounters the first curved surface (22) at a 30° angle of incidence. Refraction at this surface causes the ray to enter the air gap at an angle of 49.5° to the normal to the curved surface (22). After transiting the air gap, this ray has dropped below its entry height by approximately 0.045R and encounters the second curved surface at an angle of incidence of 47.0°. Refraction at this surface causes the ray to enter the second lens (30) at an angle of incidence of 28.8°. This ray has now been deviated in the downward direction by approximately 1.1°. Upon refraction at the final flat surface (31) this downward deviation is increased still further to approximately $\delta \approx 1.7°$. Thus, while the intent of the device was to neither deviate nor translate this ray, because of the air gap, the ray is both deviated by more than one degree and translated by more than 4% of the radius of the curved surfaces (R). The amount of this undesired deviation (aberration) and undesired translation (distortion) is a function of both the radial distance of the incident ray from the axis of the device and the length of the air gap. Thus the device is distorting and aberrating beams that are transmitted through it. The transmission of this (B) ray depends upon the polarization of the light. For unpolarized light the transmission will be less than the transmission of the central ray described in the preceding paragraph.

The third ray (C) enters at a height of 0.67R above the center of the device and encounters the first curved surface (22) at an angle of incidence of 42°. This exceeds the critical angle of 41.1° and this ray undergoes total internal reflection (TIR) at the first curved surface, as is well known to those skilled in the art. None of this (C) ray is transmitted, no matter what the polarization of that ray. The transmission of any ray entering at a height of 0.657 R or higher will be zero. These rays will be extinguished or completely vignetted by the device.

In accordance with another embodiment, these distortions, aberrations and vignettings may be reduced by ensuring that the diameter of the device is less that the radius of curvature of the curved surfaces (D<R), but for some applications it is preferred to have (D~R). These distortions, aberrations and vignettings may then be eliminated by reducing the gap to zero thickness or by filling the gap with a substantially index matching fluid. However, all prior art devices that reduce the gap thickness or fill the gap with index matching material have limitations, as was described earlier in this document.

Figure 4A:
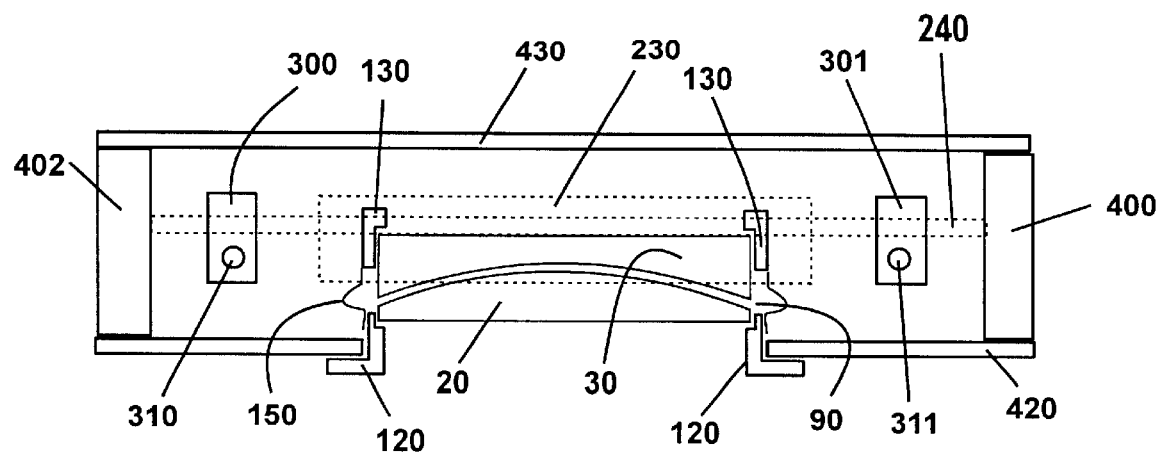
FIG. 4A is a cross-sectional view of the mechanical and optical components of one illustrative embodiment of an adjustable optical wedge of the present invention, viewed from the side.
Figure 4B:
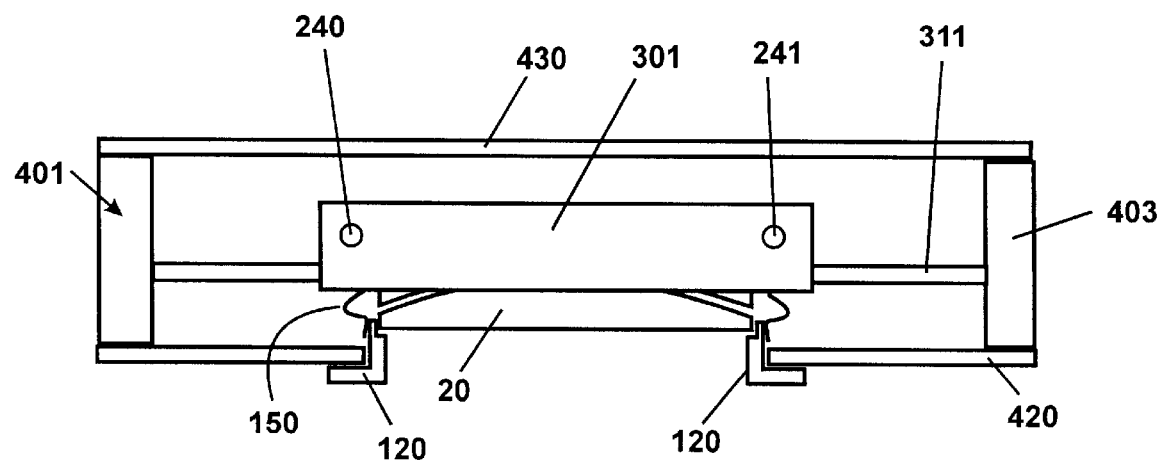
FIG. 4B is a cross-sectional view of the mechanical and optical components of one illustrative embodiment of an adjustable optical wedge of the present invention, viewed from the top.

FIGS. 4A and 4B show a cross sectional side and top views, respectively, of both the mechanical and optical components of this preferred embodiment of this invention. In FIGS. 4, the positive lens (20) is held in the positive lens holder ring (120). The positive lens holder ring (120) is fastened into a hole nominally in the center of front face plate (420). Front face plate (420) is fastened to a nominally rectangular frame constructed of frame support pieces (400, 401, 402, and 403). By this construction the positive lens (20) is held stationary in the device.

Negative lens (30) is held in negative lens holder ring (130). Negative lens (30) is contacted to positive lens (20) with a thin layer of lubricant (90), as previously described. A flexible bellows or membrane (150) may be attached to both lens holder rings (120) and (130) to form a reservoir to seal in additional amounts of the lubricant and/or protect the exposed portions of lenses (20) and/or (30) from exposure to dust and other contaminants in the ambient environment.

Figure 4C:
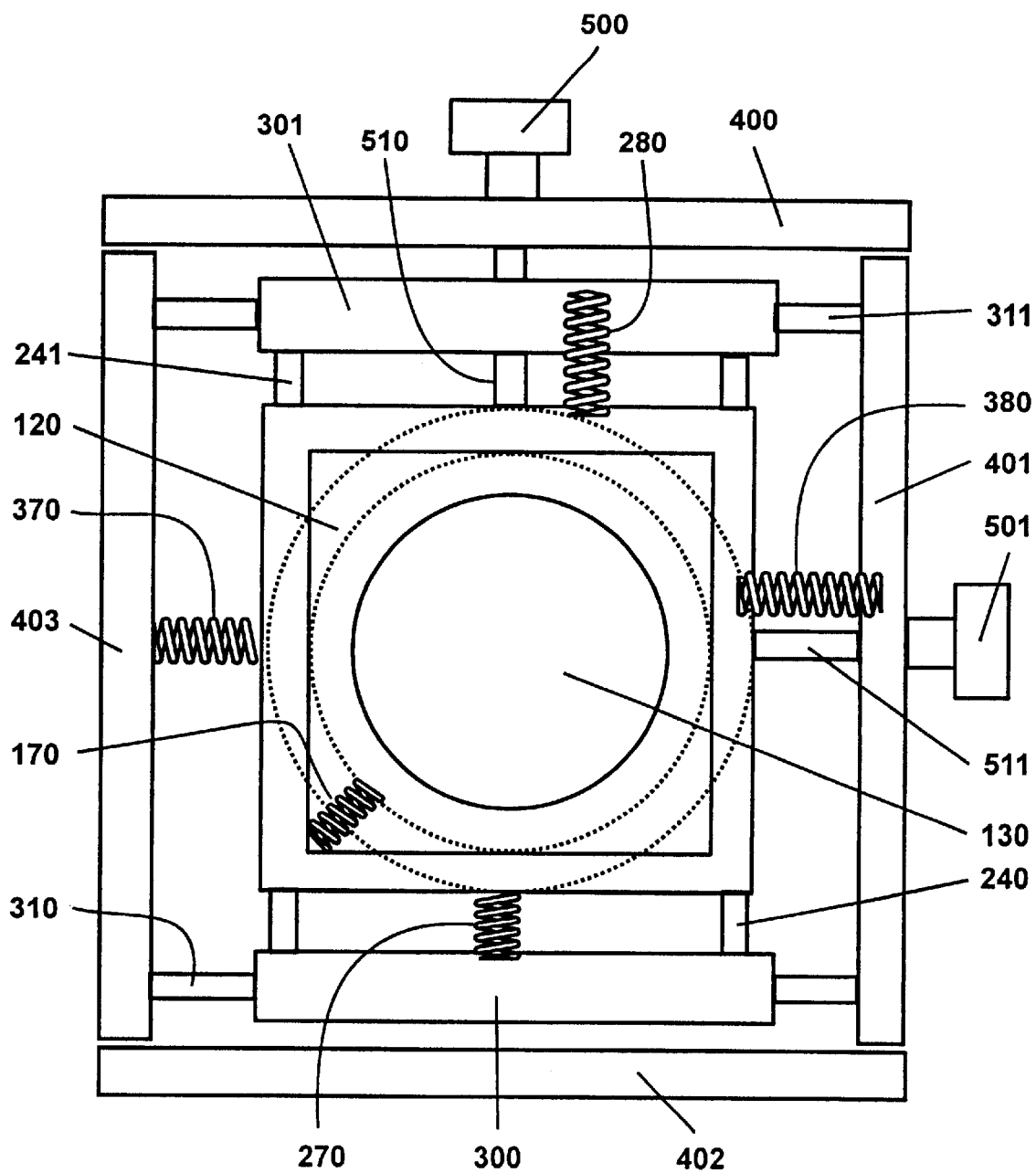
FIG. 4C is a cross-sectional view of the mechanical and optical components of one illustrative embodiment of an adjustable optical wedge of the present invention, viewed along the axis of the light. The outer covers are not shown so that the inner details are visible.

FIG. 4C shows an axial view of both the mechanical and optical components of this preferred embodiment of this invention. In FIG. 4C, lens slider (230) encloses the negative lens holder ring (130), which is behind positive lens holder ring (120). The lens slider (230) is supported and guided by the two upper guide rods (240) and (241). Upper guide rods (240) and (241) constrain the motion of the lens slider (230) along the vertical direction. Guide rods (240) and (241) are held by the lower slide assemblies (300) and (301). Lower guide rods (310) and (311) pass through lower slide assemblies (300) and (301) and constrain their motion to the horizontal direction. The lower guide pins (310 and 311) are held by opposing frame members (401) and (403).

Actuator (500) is fastened in a hole through flame support piece (400) so as to move or position the lens slider (230) in the vertical directions. Actuator (501) is fastened in a hole through frame support piece (401) so as to move or position the lens slider (230) in the horizontal directions. Manual micrometer screws are shown, but other types of actuators may be used, as is well known to those skilled in the art. The push pins of actuators (500) and (501) that contact and move the lens slider assembly (230) are shown as (510) and (511), respectively.

A compression springs may be placed at (270 and/or 370) to keep the lens slider (230) positioned adjacent to the actuator push pins (510 and 511, respectively). Tension springs may, alternatively or in addition, be placed at (280) and (380) to keep the lens slider (230) positioned adjacent to the actuator push pins (510) and (511), respectively. A compression spring (170) may be used to keep the lens holder ring (130) adjacent to the actuator sides of lens slider (230).

Rear face plate (430) is secured to the other side of the frame constructed of pieces (400, 401, 402 and 403). Both face plates (420) and (430) have a hole through which the light beam passes. Neither face plate is shown in FIG. 4C, so that the internal moving parts of the device may be more clearly shown. One or both face plates may have one or more small access holes in them to admit additional amounts of the lubricant to the exposed surfaces of lenses (20) and/or (30). Similar holes or passageways may be placed in frame members (400, 401, 402, or 403).

The lenses used in the experimental model of this preferred embodiment were both made of a common optical glass, BK-7. Both the plano-convex and the plano-concave lens had a radius of curvature of 51.68 mm and diameter of 50 mm. Lens translations of +/−6.4 mm deviated the beam by approximately +/−3.3°, which is enough for many practical applications.

The lubricant was "Resolve" Microscope Immersion Oil - Low Viscosity, manufactured by Criterion Sciences, Division of Cornwell Corporation, Riverdale, N.J. 07457-1710. This highly transparent (water white) features a refractive index ($n_{liq}$) of 1.516, which closely matches the refractive index of the BK-7 glass used for both lenses ($n_{20}=n_{30}=n$). It is a mixture of hydrogenated terphenyls, terphenyls, mineral oil and polybutane. It is available with a viscosity of 150 cps or 1250 cps. Both versions worked well. It does not contain any PCBs, is stable and low in toxicity. Common 5W-30 motor oil also worked, but its transmission was not as high as the transmission of the microscope immersion oils. We expect that a large number of liquids, including silicones, hydrocarbons and fluorosilicones will be suitable lubricants.

The key features are that the lubricant must wet the surfaces of the lenses for extended periods of time and for numerous translations. It must hold the two closely matched curved surfaces together via surface tension. The lubricant must not entrap air bubbles between the two lenses and must not evaporate during extended exposure to air (when the lenses are not in the null position). It must be transparent to the light being used and must not harden or discolor. It's refractive index should match that of the lenses, but antireflection coatings can be added between the lens and the lubricant if the refractive index of the lubricant does not match the refractive index of the lenses. For higher speed applications, the lubricant should allow for easy movement of one lens with respect to the other lens and should not heat up excessively during rapid movements for extended periods of time.

We found that 4–5 drops of the lubricant placed in the hollow of the concave surface would completely cover the curved surfaces when the convex lens was pressed against the wetted concave surface and worked back and forth several times to spread the lubricant. Once so wetted the two lenses would remain in contact with each other (due to surface tension) no matter what their position (horizontal, vertical or anywhere in between). When either flat surface was near vertical, it was necessary to support both lenses as any lens that was free to move would slide downward due to gravity.

The surfaces remained wetted during and after numerous translations which exposed parts of both lenses to air for extended periods. After many extended translations, the lubricant might occasionally fail to completely or uniformly wet one or both of the curved surfaces that are exposed to air near the outer edge of a lens. In those areas where the lubricant no longer wets the surface there will be increased reflection of the light and perhaps also increased friction or resistance to movement, both of which are generally undesirable. In another embodiment, this problem can be solved by moving the lenses back and forth several times to again spread the lubricant over all of the curved surfaces. In another embodiment, adding additional lubricant and moving the lenses back and forth several times spreads the lubricant completely over the curved surfaces. In another embodiment, restricting the beam to the central part of the lenses ensures that the transmitted beam encounters only wetted internal surfaces. It has been found that if the light beam and the center of the movable lens are restricted to the central 25% of the stationary lens diameter, the lubricant will continue to wet and contact the central portion of both surfaces for greatly extended periods of time.

FIG. 5 is a cross section view of an embodiment of present invention with a range of deviation from approximately 27° to 33°. In many applications the desired range of deviation of a transmitted light beam is a few degrees on either side of zero deviation (for example −3° to +3°). In other applications a similar range of deviation is desired, but centered about a finite deviation. In accordance with another embodiment, this can be accomplished by putting an additional (or bias) prism next to the piano surface of at least one lens. In FIG. 5, both lenses (20 and 30) are arranged as before, but an additional wedged element (40) is added. With the lenses in their centered position, the device produces a deviation of approximately 30°. Components (40) and (20) may be separate, as shown, or may be combined into one piece.

Because the refractive index of the material used for the components of the adjustable optical wedge is different for each different wavelength, each wavelength of a polychromatic light beam will be deviated by a different amount. This chromatic difference in deviation is called dispersion. In some applications, such as spectrometers, the dispersion is desired, in others, such as beam directors for color slide projectors, dispersion is not desired. In another embodiment, for those applications where deviation is desired without dispersion, an additional wedge (either fixed angle or adjustable) using material with a different material dispersion (of refractive index) is added to minimize the dispersion or achromatize the device. By a suitable choice of materials and design, the chromatic difference of deviation or dispersion can be minimized.

Figure 6:
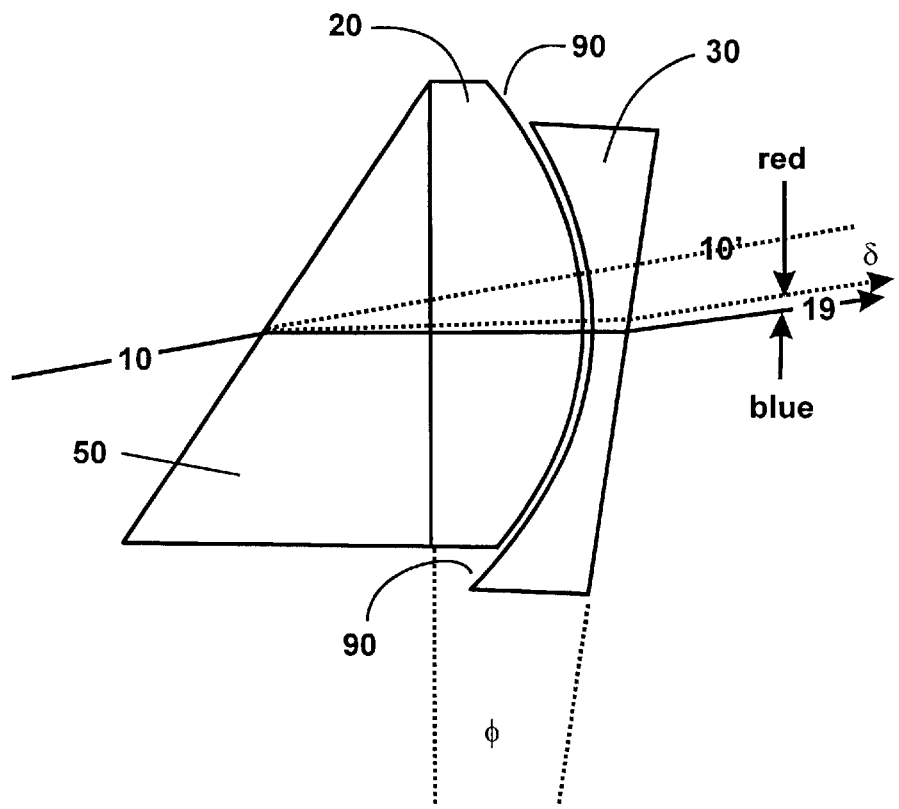
FIG. 6 is a cross-sectional view of the optical components of one illustrative embodiment of an adjustable optical wedge of the present invention that has been achromatized to make the deviation equal for two different wavelengths of light.

FIG. 6 is a cross sectional view of the optical components of one embodiment of the present invention in which at least two different materials with differing refractive index dispersions are used to achromatize the deviation of transmitted polychromatic light. Component (50) is shown as a fixed or nonadjustable wedge or prism, but could be an adjustable prism of the present invention. Components (30) and (20) are made of the same material, which has a material dispersion of refractive index different than that of the material used in component (50). Components (30) and (20) make an adjustable optical wedge which deviates the light beam in a direction opposite to the deviation imparted by prism or wedge (50). The total deviation (δ) produced by this technique is less than would be created by component (50) or components (20 and 30) alone, but with appropriate design the total deviation can be made equal for two different wavelengths, thus reducing the dispersion of polychromatic light as desired.

In this example the first fixed wedge (50) has $n_{50/red}$= 1.50868 and $n_{50/blue}$=1.51673, where $n_{50/red}$ and $n_{50/blue}$ are the refractive indices of fixed prism (50) for red and blue light, respectively. The two elements of the adjustable optical wedge (20 and 30) have $n_{30/red}$=1.61611 and $n_{30/blue}$=1.63327. The angle of the fixed wedge is 15° and the angle of the adjustable wedge is 8.6°. With an incident angle of 20°, both the red light and the blue are deviated by 2.7°, demonstrating the achromatization of the optical wedge. Many similar arrangements are possible and fall within the scope of this invention as long as the curved surfaces are contacted together by a lubricant.

Figure 7:
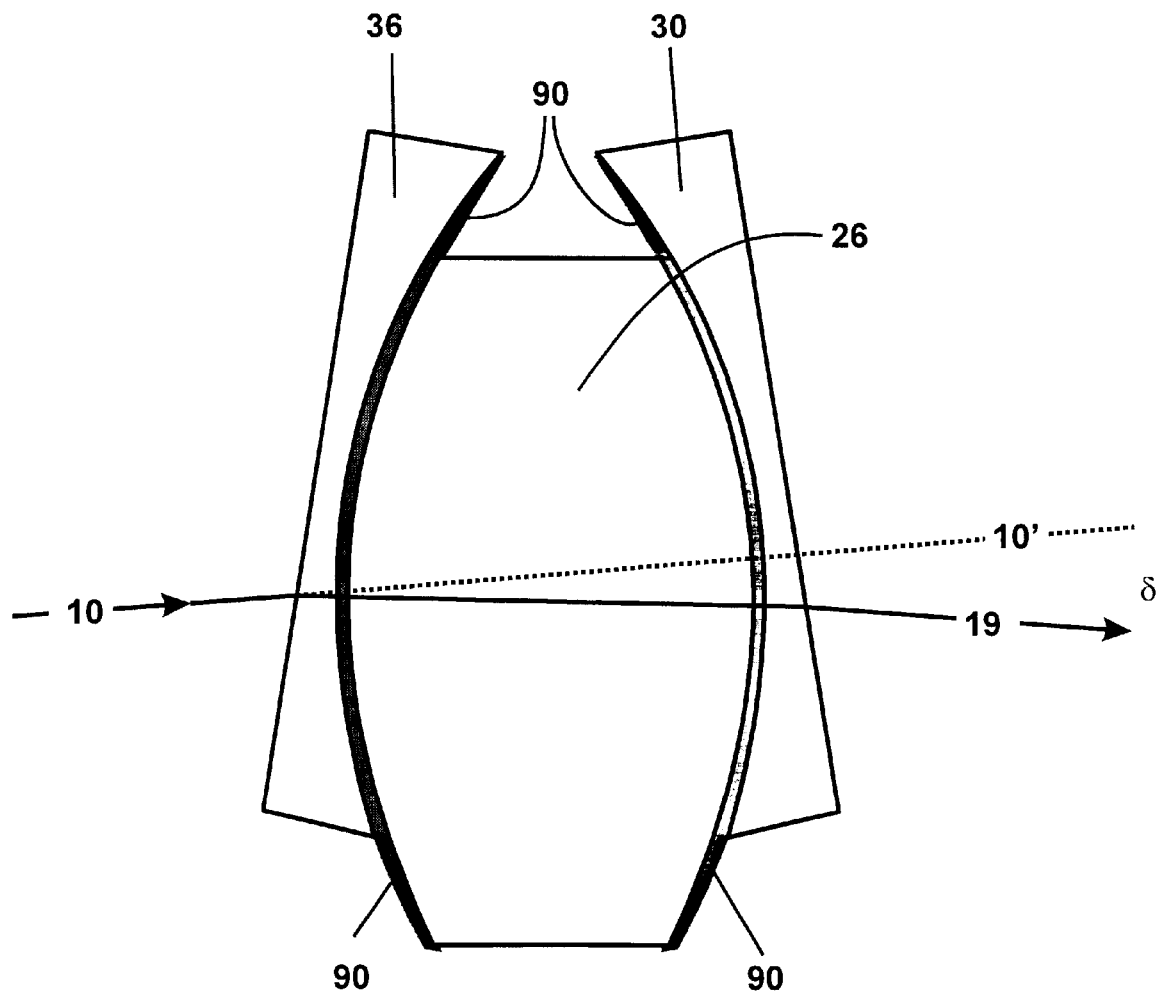
FIG. 7 is a cross-sectional view of the optical components of one illustrative embodiment of an adjustable optical wedge of the present invention that uses two moveable lenses to increase the range of deviation available from the device.

In accordance with another embodiment, larger ranges of deviation may be obtained by using components with sharper curvatures (smaller radii of curvature), by using two or more adjustable optical wedges in series, or by combining two adjustable wedges into one. One example of combining two adjustable wedges is shown in FIG. 7. Components (36) and (30) are plano-concave lenses which are in lubricated contact with both sides of the biconvex lens (26) in the manner of this present invention, as previously described.

In accordance with another embodiment, an alternative to using spherical surfaces and translations along two orthogonal directions is to use translation of a cylindrical or spherical surface along one axis and a rotation of the entire device about the nominal beam axis. It then requires one linear actuator and one rotary actuator. This polar coordinate version of the adjustable wedge can adjust a beam anywhere within its circular limits. The previously described Cartesian coordinate versions can adjust a beam anywhere within its rectangular limits.

In accordance with another embodiment, the lubricant (90) may not have a refractive index ($n_{liq}$) equal to the refractive index (n) of at least one of the lenses it contacts. For example, many infrared transmitting materials have large refractive indices (n>2.0) which can not be conveniently matched by any suitable lubricant. In these cases, antireflection (AR) coatings may be applied to the curved surfaces to greatly reduce the reflection of light at the two curved lens/lubricant interfaces. The external (flat) surfaces may also be antireflection coated, but that coating will be a different coating because the refractive index of the material in contact with those surfaces (usually air) is different than the refractive index of the lubricant that contacts the curved surfaces. These properties of antireflection coatings are well known to those skilled in the art.

In accordance with another embodiment, using lenses of differing refractive indices may be advantageous ($n_{20} \neq n_{30}$). When all of the lenses in the device have the same refractive index and the outer surfaces are flat, the device will have no focusing or unfocusing effect upon a transmitted light beam. Such a device is said to have zero optical power. If the positive (convex) lens or lenses have a higher refractive index than the negative (concave) lens or lenses, the device will have a positive optical power or a focusing effect upon a transmitted light beam. Similarly, if the positive lens or lenses have a lower refractive index than the negative lens or lenses, the device will have a negative optical power or an unfocusing (diverging) effect upon a transmitted light beam. Optical power may also be created by using at least one curved external surface, as is well known to those skilled in the art.

In accordance with another embodiment, the adjustable wedge technique of the present invention may also be used to good advantage to control the orientation of a mirror or reflective surface. Conventional mirror mounts (FIG. 8A) are limited in their ability to make very small angular changes in the orientation of a surface because the angular change ($\phi_m$) is a given by the longitudinal translation of the mirror (T') divided by the lever arm or distance from the pivot point (99) to the actuator (95). In a compact device, that distance from the pivot point (99) to the actuator (95) is limited to the diameter (D) of the device, so $$\phi_m \sim T'/D \qquad \text{EQ. 11}$$

The diameter (D) is often no more than a few centimeters and the ability to make very small adjustments in the angle of the mirror is made difficult by this limited distance and the stiction of any mechanical movement.

If, however, the outer surface (21) of the adjustable optical wedge is made reflective, the change in angle of this reflecting surface (φ) is then given by the transverse translation (T) divided by the radius of the curved surfaces (R).

$$\tan \phi = T/R \qquad \text{EQ. 2}$$

As this radius (R) may be several hundreds of centimeters, the effective lever arm of this "mirror mount" can be very large, even in a compact device. With R>>D, very small changes in the angle of the reflected light ($\phi < \phi_m$) become practical using the same actuator or translation distance as was used in the conventional mirror mount (T~T'). As before, when (φ) is small, $$\phi = T/R \qquad \text{EQ. 6}$$

Figure 8:
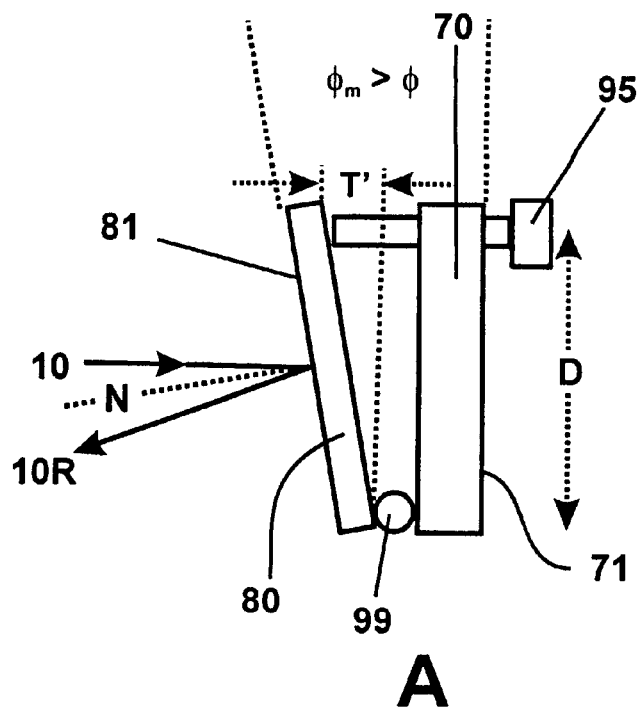
FIG. 8A is a cross sectional view of a prior art mirror mount and FIG. 8B is a cross sectional view of the optical components of one illustrative embodiment of an adjustable optical wedge of the present invention, used as an adjustable mount for a reflective surface.
Figure 8:
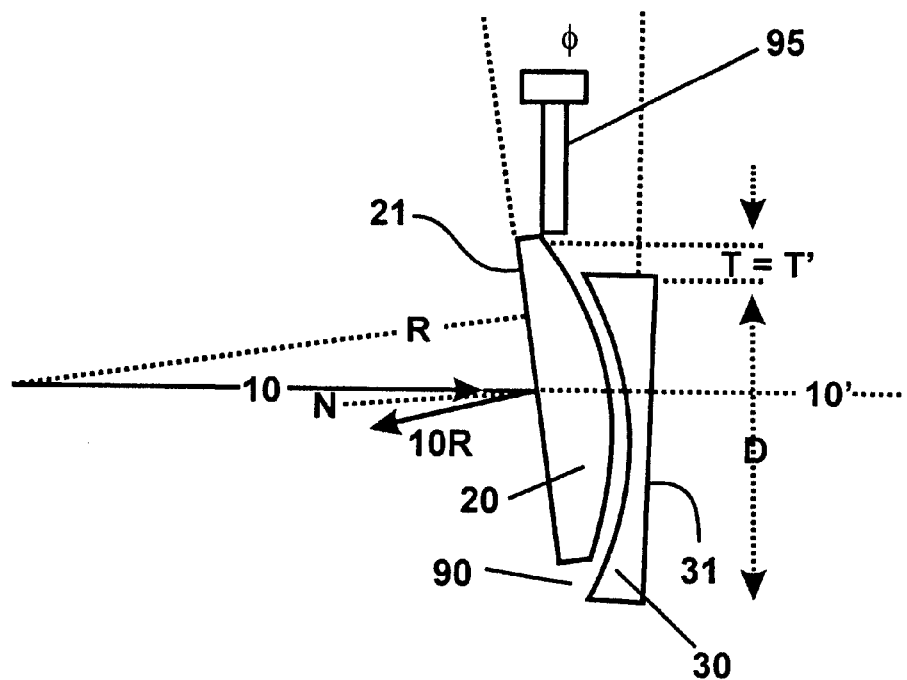

FIG. 8B is a cross sectional view of one embodiment of the present invention in which the device is used to control the direction of a reflected light beam instead of, or in addition to, controlling the direction of a transmitted light beam. FIG. 8A is a cross section view of a common prior art mirror mount for adjusting the direction of a reflected light beam. In FIG. 8, an incident light beam (10) travels from left to right, encountering the reflecting surface slightly away from normal incidence. The reflected beam is shown as (10R)

In FIG. 8A, mirror (80) with reflecting surface (81) is pivoted at point (99). Point (99) is attached to reference base (70) which is fixed in position. An actuator (95) adjusts the distance (T') between the tops of components (70 and 80), thereby adjusting the angle ($\phi_m$) between the reflecting surface (81) and the rear surface (71) of the reference base (70). The distance (T') is zero when the two surfaces (71) and (81) are parallel, positive when the tops of the two components are farther apart and negative when the tops of the two components are closer together.

In FIG. 8B the incident light beam (10) encounters surface (21), which is made reflecting in this example. Component (30) is fixed in position. An actuator (95) translates component (20) off of the centered position by a distance (T), creating the angle (φ) between surfaces (21) and (31).

Because (R) is larger than (D), ($\phi$) is less than ($\phi_m$), if the same translation distance is used in both devices (T=T').

When the adjustable wedge of the present invention is used as only a reflector, the lubricant can be chosen to optimize its lubricating role as the lubricant need not be transparent nor have any particular refractive index. Similarly, the lenses or components need not be transparent, so the material for those components may be chosen to optimize other characteristics such as thermal conduction, flatness, or reflectivity, for example.

Thus, the present invention, besides being useful to direct transmitted light, as previously described, may be preferred in applications that require very small changes in the angle of a reflective surface. Such new applications for the adjustable wedge technique of the present invention could include reflectors in lasers, interferometers or other precision optical instruments.

In accordance with another embodiment, one of the elements with a curved surface is a laser rod or similar laser element. The external surface of the second element with the matching curved surface may be transmissive or reflective. In the embodiment wherein the external surface of the second element is reflective, the present invention may be used to align the reflectors of a laser oscillator. In the embodiment wherein the external surface of the second element is transmissive, the present invention may be used to direct the laser beam to a reflector, target or other component.

In accordance with another embodiment, adjustable optical wedges of the present invention may also be used in other applications for wedges, including "wedge lighting" and correcting aberrations of tilted plates used to transmit converging light beams.

The present invention fulfills all of the objectives and advantages set forth above. It will be apparent to those skilled in the art, that various changes, modifications, and other uses and applications are possible. For example, the lenses may be made of plastic or crystalline material, instead of glass, other fluids may be used, the range of translation and deviation may differ in orthogonal directions, the device may be used with non-optical beams, and the device may be used for non-optical applications. These examples are merely illustrative. All such variations and equivalents are deemed to be included by this invention, which is limited only by the claims that follow and the doctrine of equivalents.

What is claimed is:

1. An adjustable wedge comprising at least one first component with a convex surface and at least one second component with a concave surface, the concave and convex surfaces having curvatures which are substantially equal and said concave and convex surfaces being contacted together by a thin layer of lubricant, where all the layers of the wedge have substantially the same index of refraction.

2. The device of claim 1 in which said first and said second components and lubricant are nominally transparent to a light beam.

3. The device of claim 2 in which the refractive index of the lubricant is substantially equal to the refractive index of at least one component that the lubricant contacts.

4. The device of claim 2 in which the refractive index of the lubricant is not equal to the refractive index of at least one of said first and second components that the lubricant contacts and an antireflection coating is applied to the curved surface of that last recited component to reduce the reflection of light at that interface.

5. The device of claim 2 in which the device may be tilted to translate a transmitted beam.

6. The device of claim 2 in which the convex and concave components have substantially the same refractive index.

7. The device of claim 2 in which at least one curved external surface is used to affect the focusing of a transmitted light beam.

8. The device of claim 2 in which the refractive index of at least one component is different from the refractive index of at least one other component.

9. The device of claim 8 in which at least one component has a material refractive index dispersion different than the material refractive index dispersion of at least one other component, such that the device has nominally equal deviation for at least two different wavelengths.

10. The device of claim 2 in which at least one component is a laser rod or laser element.

11. The device of claim 2 in which the transverse extent of the moveable component is larger than the transverse extent of the stationary component.

12. The device of claim 2 in which the (diameters or) transverse extents of at least two of the components are nominally equal.

13. The device of claim 2 in which the transverse extent of the stationary component is larger than the transverse extent of the moveable component.

14. The device of claim 2 including a projector and a viewing screen means to direct the beam from said projector to said viewing screen.

15. The device of claim 2 including means to stabilize the position of an image.

16. The device of claim 2 including means to minimize the aberrations introduced into a transmitted light beam.

17. The device of claim 1 in which translation of at least one component is used to control the direction of light reflected by one or more of the surfaces.

18. The device of claim 1 in which the external surfaces are flat (plano).

19. The device of claim 1 in which the internal curved surfaces are substantially cylindrical.

20. The device of claim 1 in which the internal curved surfaces are substantially spherical.

21. The device of claim 20 in which the movement of at least one component includes translation in one direction.

22. The device of claim 20 in which the movement of at least one component includes translation in two orthogonal directions.

23. The device of claim 1 in which at least one movable lens is mounted within and guided by a ring which is held within a frame translatable in two dimensions by crossed slides; said ring having an outer surface that is spherical such that the movable lens and ring revolve about the center of the lens's curved surface when the frame is translated in two dimensions and including springs to reduce backlash.

24. The device of claim 1 is which manual means are used to translate at least one component.

25. The device of claim 1 is which electrical means are used to translate at least one component.

26. The device of claim 1 in which pneumatic means are used to translate one or more components.

27. The device of claim 1 in which hydraulic means are used to translate one or more components.

28. The device of claim 1 in which no reservoir is used to contain the lubricant.

29. The device of claim 1 in which a reservoir is used to contain the lubricant.

30. The device of claim 1 in which a passageway is provided to supply additional lubricant to the lubricated curved surfaces.

31. The device of claim 1 in which a wick is provided to supply lubricant to the lubricated curved surfaces.

32. A device according to claim 1 wherein said lubricant comprises a composition of matter that; has sufficient wetting ability to wet the curved surfaces of said first and second components for extended periods of time and numerous translations, a refractive index generally compatible with the refractive index of said components, holds the two components together via surface tension, has sufficient viscosity to flow over said adjacent surfaces, does not entrap air bubbles between the two components, does not evaporate during extended exposure to air, is transparent to the light being used and does not harden or discolor.

33. A device according to claim 32 wherein the refractive index of the lubricant does not match the refractive index of at least one lens and antireflection coatings are added to at least one curved surface in contact with the lubricant.

34. A device according to claim 32 wherein the lubricant allows for easy movement of one lens with respect to the other lens and does not heat up excessively during rapid movements for extended periods of time.

35. A device according to claim 32 wherein said lubricant contains at least one terphenyl.

36. A device according to claim 35 wherein said polymer is polybutane.

37. A device according to claim 32 wherein said lubricant contains at least one halogenated terphenyl.

38. A device according to claim 32 wherein said lubricant contains a polymer.

39. A device according to claim 32 wherein said lubricant contains mineral oil.

40. The device of claim 1 where all the layers of the wedge have substantially the same index of refraction.

41. The device of claim 2 in which the refractive index of at least one component is different from the refractive index of at least one other component.

* * * * *

UNITED STATES PATENT AND TRADEMARK OFFICE
CERTIFICATE OF CORRECTION

PATENT NO. : 6,320,705 B1
DATED : November 20, 2001
INVENTOR(S) : Dube'

It is certified that error appears in the above-identified patent and that said Letters Patent is hereby corrected as shown below:

Drawings,
Figures 1 and 2B, "90" should be shown in gray
Figure 4A, the two upper outer edges of the lens ring (130) should be changed from flat to spherical with diameter equal to the ring's outer diameter
Figure 4C, "230" needs to be added to show the lens slider Column 5,
Line 31, change "(water white) features" to "(water white) oil features"
Line 51, the first "$\theta$" should be -- $\theta'$ -- (theta should be theta-prime)
Line 63, change "(T')," to -- (T') in Fig. 8A, --

Column 6,
Line 6, change "(T)," to -- (T) in Fig. 8B, --
Line 39, change "$i_s$" to -- in --

Column 7,
Line 67, add a period after "photodegradation"

Column 8,
Line 1, change "as" to -- an --

Column 9,
Line 38, add a period after "fashion"

Column 12,
Line 65, eliminate "lower"

Column 13,
Line 3, change "flame" to -- frame --
Line 34, "50 mm" should be -- 25 mm --
Line 39, change "(water white) features" to -- (water white) oil features --

UNITED STATES PATENT AND TRADEMARK OFFICE
CERTIFICATE OF CORRECTION

PATENT NO. : 6,320,705 B1
DATED : November 20, 2001
INVENTOR(S) : Dube'

It is certified that error appears in the above-identified patent and that said Letters Patent is hereby corrected as shown below:

Column 14,
Line 34, change "of present" to -- of the present --
Line 42, change "piano" to -- plano --

Column 18,
Line 53, change "is" to -- in --
Line 55, change "is" to -- in --

Signed and Sealed this

Twenty-ninth Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,320,705 B1
DATED         : November 20, 2001
INVENTOR(S)   : Dube'

It is certified that error appears in the above-identified patent and that said Letters Patent is hereby corrected as shown below:

<u>Title page,</u>
Item [76], please add -- Ronald E. Juhala -- as co- inventor.

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

| | |
|---|---|
| PATENT NO. | : 6,320,705 B1 |
| APPLICATION NO. | : 09/227436 |
| DATED | : November 20, 2001 |
| INVENTOR(S) | : Dube' |

It is certified that error appears in the above-identified patent and that said Letters Patent is hereby corrected as shown below:

<u>Title page</u>,
Item [76], please add -- Roland E. Juhala -- as co- inventor.

This certificate supersedes Certificate of Correction issued February 17, 2004.

Signed and Sealed this

Second Day of October, 2007

JON W. DUDAS
*Director of the United States Patent and Trademark Office*